(12) United States Patent
Drewes

(10) Patent No.: US 9,174,506 B2
(45) Date of Patent: Nov. 3, 2015

(54) CHASSIS SYSTEM FOR COMMERCIAL VEHICLES

(71) Applicant: SAF-HOLLAND GmbH, Bessenbach (DE)

(72) Inventor: Olaf Drewes, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 14/352,218

(22) PCT Filed: Oct. 31, 2012

(86) PCT No.: PCT/EP2012/071533
§ 371 (c)(1),
(2) Date: Apr. 16, 2014

(87) PCT Pub. No.: WO2013/072192
PCT Pub. Date: May 23, 2013

(65) Prior Publication Data
US 2014/0252740 A1      Sep. 11, 2014

(30) Foreign Application Priority Data
Nov. 16, 2011    (DE) .......................... 10 2011 086 481

(51) Int. Cl.
*B60G 9/00*     (2006.01)
*B60G 7/00*     (2006.01)
*B60G 21/05*    (2006.01)

(52) U.S. Cl.
CPC ................ *B60G 9/003* (2013.01); *B60G 7/001* (2013.01); *B60G 21/051* (2013.01);
(Continued)

(58) Field of Classification Search
CPC ............ B60G 3/12; B60G 3/14; B60G 3/145; B60G 9/003; B60G 21/051; B60G 21/052; B60G 2200/31; B60G 2204/4306; B60G 2206/821; B60G 7/001; B60G 2206/20; B60G 2206/8209; B60G 2204/148; B60G 2206/50; B60G 2206/30; B60B 2310/318; Y10T 29/49622
USPC ........... 29/897.2; 301/131, 132; 280/124.116, 280/124.125, 124.128, 124.13–124.132, 280/124.153, 124.166
See application file for complete search history.

(56) References Cited

U.S. PATENT DOCUMENTS 2,738,185 A * 3/1956 Coskun .......................... 267/273
3,207,497 A * 9/1965 Schoonover ................... 267/283
(Continued)

FOREIGN PATENT DOCUMENTS

DE          4441971          5/1996
DE         19733158          2/1998
(Continued)

OTHER PUBLICATIONS

European Patent Office, International Search Report, Nov. 29, 2012.

*Primary Examiner* — Laura Freedman
(74) *Attorney, Agent, or Firm* — Price Heneveld LLP

(57) ABSTRACT

A chassis system for commercial vehicles includes an axle stub element and a linkage element, wherein the linkage element has a recess and the axle stub element has a first mounting section, wherein the first mounting section is arranged in the recess of the linkage element and is force-locked at the recess due to a shaping process, and wherein an adhesive layer, via which a material band is formed between the first mounting section of the axle stub element and the recess of the linkage element, is provided between the first mounting section and the recess.

24 Claims, 3 Drawing Sheets

(52) U.S. Cl.
CPC ...... *B60G 2200/31* (2013.01); *B60G 2204/148* (2013.01); *B60G 2206/20* (2013.01); *B60G 2206/30* (2013.01); *B60G 2206/50* (2013.01); *B60G 2206/821* (2013.01); *B60G 2206/8209* (2013.01); *Y10T 29/49622* (2015.01)

(56) References Cited

U.S. PATENT DOCUMENTS

| | | | | |
|---|---|---|---|---|
| 3,601,424 | A * | 8/1971 | Badland | 280/124.13 |
| 3,601,426 | A * | 8/1971 | Hury | 280/124.13 |
| 3,701,564 | A * | 10/1972 | Puzik | 301/131 |
| 3,783,639 | A * | 1/1974 | Goodman et al. | 464/83 |
| 3,844,583 | A * | 10/1974 | Sakow et al. | 280/124.102 |
| RE28,259 | E * | 12/1974 | Henschen | 267/279 |
| 4,429,900 | A * | 2/1984 | Feher | 280/124.128 |
| 4,758,019 | A * | 7/1988 | Tucker-Peake et al. | 280/124.109 |
| 5,163,701 | A * | 11/1992 | Cromley, Jr. | 280/124.13 |
| 5,277,450 | A * | 1/1994 | Henschen | 280/6.151 |
| 5,326,128 | A * | 7/1994 | Cromley, Jr. | 280/656 |
| 5,785,332 | A * | 7/1998 | Pollock et al. | 301/131 |
| 5,800,024 | A * | 9/1998 | Steimmel et al. | 301/127 |
| 5,899,470 | A * | 5/1999 | Heitzmann | 280/86.751 |
| 6,039,336 | A * | 3/2000 | Frey | 280/124.128 |
| 6,086,162 | A | 7/2000 | Pinch et al. | 301/124.1 |
| 6,145,858 | A * | 11/2000 | Foulquier | 280/124.13 |
| 6,299,259 | B1 | 10/2001 | MacKarvich | 301/127 |
| 6,340,165 | B1 * | 1/2002 | Kelderman | 280/124.153 |
| 6,447,073 | B1 * | 9/2002 | Goettker | 301/127 |
| 6,565,159 | B1 | 5/2003 | Kosak | |
| 7,347,435 | B2 * | 3/2008 | Chalin | 280/124.116 |
| 7,416,342 | B2 * | 8/2008 | Peters et al. | 384/222 |
| 7,484,813 | B2 * | 2/2009 | Dantele | 301/132 |
| 7,497,450 | B2 * | 3/2009 | Galazin | 280/124.116 |
| 7,726,674 | B2 * | 6/2010 | VanDenberg et al. | 280/124.128 |
| 7,900,942 | B2 * | 3/2011 | Koschinat | 280/124.111 |
| 7,954,833 | B1 * | 6/2011 | Heath et al. | 280/124.116 |
| 7,967,087 | B2 * | 6/2011 | Arulraja et al. | 180/9.5 |
| 7,967,308 | B2 * | 6/2011 | Toepker | 280/124.106 |
| 8,046,893 | B2 * | 11/2011 | Criqui et al. | 29/458 |
| 8,226,101 | B2 * | 7/2012 | Lariviere | 280/124.169 |
| 8,322,737 | B2 * | 12/2012 | Dodd et al. | 280/124.128 |
| 8,414,087 | B2 * | 4/2013 | Wibbeke et al. | 301/124.1 |
| 8,764,123 | B2 * | 7/2014 | Schmitz et al. | 301/124.1 |
| 8,777,241 | B1 * | 7/2014 | Hamernik | 280/93.512 |
| 8,870,204 | B2 * | 10/2014 | Buschjohann et al. | 280/124.128 |
| 2006/0022424 | A1 * | 2/2006 | Reynolds | 280/124.169 |
| 2007/0246286 | A1 * | 10/2007 | Henze | 180/349 |
| 2015/0054245 | A1 * | 2/2015 | Drewes et al. | 280/124.111 |

FOREIGN PATENT DOCUMENTS

| | | | |
|---|---|---|---|
| DE | 20119641 | 2/2002 | |
| DE | 10 2005 038 274 | 2/2007 | |
| EP | 1125775 | 8/2001 | |
| FR | 82194 | 1/1964 | |
| FR | 2103756 | 4/1972 | |
| FR | 2888559 | 1/2007 | |
| WO | WO 9112148 A1 * | 8/1991 | B60G 3/14 |
| WO | 02066270 | 8/2002 | |
| WO | 2008055958 | 5/2008 | |
| WO | 2009053491 | 4/2009 | |

* cited by examiner

CHASSIS SYSTEM FOR COMMERCIAL VEHICLES

BACKGROUND OF THE INVENTION

The present invention relates to a chassis system for commercial vehicles.

Chassis systems for commercial vehicles are known from prior art. Mostly, the axle for a commercial vehicle is spring-mounted to one or more linkage elements and the suspension element to the vehicle frame, where a connection exists between the linkage element and the axle of the vehicle, preferably by means of welding. A disadvantage of welding processes is that, due to the high local temperature acting upon the linkage element and the vehicle axle, structural breakdowns and material stresses may occur. Known as an alternative solution is a force-fitted connection between vehicle axle and the linkage element, in particular by expanding the vehicle axle in the area of the linkage element, where, however, the force-fitted connection often is insufficient for transferring the high torsional and bending moments acting on the linkage element and the vehicle axle.

It is the object of the present invention to provide a chassis system which is easy to produce and meet the stability requirements for its application in commercial vehicles.

SUMMARY OF THE INVENTION

According to the invention, the axle assembly for commercial vehicles includes an axle stub element and a linkage element, where the linkage element has a recess and the axle stub element a first mounting section, where the first mounting section is arranged in the recess of the linkage element and is force-fitted at the recess by a forming process, and where an adhesive layer is provided, which reaches a material bond between the first mounting section of the axle stub element and the recess of the linkage element. Preferably, at least partially, the axle stub element is rotationally symmetric and is primarily used for a pivoted bearing of other components of the chassis system. For this purpose, particularly preferably, the axle stub element has areas and surfaces, on which rolling elements of a rolling bearing can roll, for example, in order to mount the pivoted hub of the wheel of a commercial vehicle to the chassis system. According to the invention, the axle stub element has a first mounting section to which the axle stub element be fixed at a recess of the linkage element. Preferably, the first mounting section of the axle stub element is also designed rotationally symmetric, for example, as a hollow body or tube-shaped and, especially preferably, has an outer contour which mainly corresponds to the inner contour of the recess of the linkage element and can be inserted into it. Preferably, as an alternative, both the outer contour of the first mounting section of the axle stub element and the inner contour of the recess of the linkage element are rectangular or cuboid, or have a rectangular cross section, respectively, where in this preferred design, in relation to the linkage element, the axle stub element is positively secured against rotation. In order to fix the axle stub element to the linkage element, preferably the first mounting section is shaped at least partially in such a way that a force-fitted connection is reached between the first mounting section and the recess of the linkage element. Here, it is especially preferred that, after the insertion into the recess by means of a high-pressure deformation process (abbreviated IHU), the first mounting section is expanded in such a way that the outer contour of the first mounting section in pressed against the inner contour of the recess of the linkage element and, this way, the axle stub element is force-fitted to the linkage element. In order to reinforce the force-fitted connection between the axle stub element and the linkage element, according to the invention, an adhesive layer is provided between the first mounting section and the recess to set up a material bond of the two opposing surfaces of the first mounting section and the axle stub elements. In other words, the adhesive layer is a bondline between the linkage element and the axle stub element. In an especially advantageous manner, the adhesive layer not only reinforces the connection between the linkage element and the axle stub element, it also prevents the ingress of moisture or contaminants into the contact area between the linkage element and the axle stub element. This way, especially preferably, the durability or the lifetime, respectively, of the form-fit or the material bond of the linkage element and the axle stub element can be increased. Especially preferably, the axle stub element is one-piece. This way, the number of parts to be mounted and, thus, the mounting work of the entire chassis system can be reduced. Advantageously, the axle stub element is made with the fewest possible process steps, for example, casting and machining or rolling.

In an especially preferred design, an axle tube element is provided, which can be fixed to the axle stub element or the linkage element, mainly in order to increase the stability of the chassis system. Preferably, the axle tube element is a tubular component that extends along an axial direction, and which preferably interconnects a pair of opposed linkage elements. In other words, the axle tube element is preferably the rigid axle of the chassis of a commercial vehicle. Advantageously, the axle tube element is fixed at a distal end in axial direction to the linkage element, where the axial direction of the axle tube element does not necessarily have to be coaxially aligned to the axial direction of the axle stub element. It is preferred that the axle tube element is mounted to the linkage element in such a way that it absorbs bending moments that are transferred from the wheels through the axle stub element to the linkage element, and secures the linkage element transversely to the axial direction against rotation. Alternatively, it may be preferred that the axle tube element is fixed directly to the axle stub element, respectively to its distal end which opposed to the preferred seating sections for roller bearings, where friction stir welding can advantageously be used for fixing the axle tube element to an axle stub element.

In a preferred way, the axle tube element is force-fitted and/or material bond to the linkage element. In order to avoid temperature stresses and changes of the structure at both the linkage element and the axle tube element when fixing the axle tube element to the linkage element, it is preferred to force-fit the axle tube element to the linkage element, which is supported by the application of an adhesive layer between the two elements. This preferred mounting procedure of the axle tube element to the linkage element is similar to the procedure by which the axle stub element is fixed to the linkage element, providing an analogy of the corresponding features. For this, the linkage element preferably has a second recess into which a first mounting section of the axle tube element can be inserted, where this first mounting section can be force fitted to the second recess of the linkage element by IHU, for example. Here, it only must be noted that, on applying IHU, the areas of the axle tube element that should not be widened by a pressure, e.g. by a fluid, in the inside of the axle tube element, they have to be protected against expansion by means of a mold element. Especially preferably, the form-fitted connection of the axle tube element and the linkage element can be supported by applying an adhesive layer and, thus, a material bond. Alternatively preferred, the axle tube element can be fixed to the linkage element by a purely firmly bonded connection as, for example, by rotation friction-stir welding or oscillating friction-stir welding.

In an especially preferred way, the axle stub element is arranged transversely to a main extension axis of the axle tube element with respect to the axle tube element, in order to force-fit one of the two elements to the linkage element by means of a forming process, while the respective other element has already a force-fitted connection to the linkage element. In order to force-fit the first and the axle stub element or the axle tube element independently from each other or in consecutive order to the linkage element, both elements are arranged preferably transversely to the axial direction or to the main extension of the axle tube element, respectively, and in staggered manner. It is preferred in particular, that the axle stub element or the axle tube element, respectively, are each inserted into or through the recess of the linkage element at the respective first mounting sections and that, for example, a bolt is inserted in opposite direction, which, in turn, enables a widening of the respective first mounting sections. By means of an offset arrangement of the axle stub element and the axle tube element to the linkage element, according to the invention, both elements can be fixed to the linkage element in consecutive order. Especially preferably, the axle tube element and the axle stub element have the same geometric features in their respective mounting sections, in order that only a transforming machine or only a bolt which is inserted into the respective mounting section for the transformation by means of a press can be used both for fixing the axle stub element and the axle tube element to the linkage element. In particular, costs for machinery and tools can be saved this way.

Preferably, a supporting element is provided, which can be fixed to the axle tube element and/or to the axle stub element and/or to the linkage element, in order to fix additional chassis elements to the chassis system. The supporting element may, for example, be a brake carrier to which a brake disk, a brake cylinder and other systems of the wheel suspension of a commercial vehicle can be fixed. Preferably, for absorbing higher moments, it is possible that the supporting element can be fixed not only to one element, for example, to the axle tube element or to the axle stub element, but also through a variety of contact or mounting points, respectively, to the axle tube element or the axle stub element or the linkage element.

Especially preferably, the supporting element is designed as a plate and has a main direction of extension, which is mainly aligned transversely to the axial direction of the axle tube element or the axle stub element, respectively.

In an especially preferred way, the supporting element has a recess into which a second mounting section of the axle tube element or a second mounting section of the axle stub element can be pressed, where another adhesive layer is provided between recess of the supporting element and the respective second mounting section, in order to form a material bond between the supporting element and one of the axle tube or axle stub elements. Similar to the fixation of the axle stub element to the linkage element, it may be preferred to fix the supporting element through a force-fitted and firmly bonded connection by means of an adhesive layer to one of the axle tube or axle stub elements. For this, the axle tube element and/or the axle stub element have a second mounting section, which is inserted into a recess of the supporting element and, subsequently, is widened in a transforming procedure. In analogy with the adhesive layer between the axle stub element and the linkage element, also at the second mounting section an adhesive layer might be applied, which forms a material bond with the recess of the supporting element when widened and, again, prevents the penetration of corrosive impurities. It is preferred in particular that the supporting element is provided at the axle stub element, where, especially preferred, the second mounting section of the axle stub element is arranged close to bearing areas for the respective hub of the axle stub element. In particular, this ensures that further systems of the chassis system can be supported by bearings close to the wheel, which is pivoted to the axle stub element.

Especially preferably, the linkage element can be fixed pivotally to the chassis of a commercial vehicle at a first distal end, where the linkage element has a seating section at a second distal end opposing the first, in order to bear a suspension element and to transfer forces from the suspension element to the axle tube element and/or to the axle stub element. Preferably, the linkage element is, for example, the axle guide of the chassis system of a commercial vehicle, where it mainly extends in parallel to the longitudinal direction of the vehicle. Preferably, at its first distal end, the linkage element is pivoted and secured against displacement in relation to the chassis at a bearing block by means of a bearing eye or a bearing bushing, respectively, where the rotation axis of the swiveling movement, especially preferably, is aligned transversely to the longitudinal direction of the vehicle and in parallel to the axial direction of the vehicle axle or to the axle tube element. At its second distal end, opposing the first end, the linkage element is supported by bearings, preferably through a seating section, at a suspension element, for example a coil spring or a suspension bag, where this suspension element mainly serves to make the swiveling movement of the linkage element virtually approach an inoperative state. The recess that is connected to the axle stub element is provided at the linkage element, preferably between the first and the second distal end or between the first distal end and the seating section for the suspension element, respectively. This way it is possible to transfer the vertical movements of the axle stub element into swiveling movements of the linkage element, where the arising vertical movements of the seating section of the suspension element at the linkage element result in a deformation of the suspension element and, this way, are attenuated by the suspension element or are returned into a rest position. It is especially preferred that the linkage element is kept as short or as compact as possible, in order to save space as well as weight, where, in an especially preferred way, the seating section for the linkage element and the recess into which the axle stub element reaches are arranged as close together as possible. It must be noted, however, that, with a very short linkage element, the swiveling movement of the linkage element results in a strongly circular movement of the linkage element's seating section when the suspension element deflects, where the spring or the suspension element, respectively, is not only deformed in a vertical direction but also can be deflected strongly in the longitudinal direction of the vehicle.

In an especially preferred way, the adhesive layer is provided by a polyurethane or an epoxy resin or a silicone. It is preferred in particular to use an epoxy resin here, because it has particularly high strength values when connecting a metal to another metal.

In an especially preferred design, the axle stub element and/or the axle tube element are transformed in such a way that at least an indentation is reached which form-fits the first mounting section and the recess of the linkage element. Preferably, it may be possible that not only a force-fit to the recess of the linkage element is reached with the transformation of the mounting section of the axle tube element, but also that the first mounting section of the axle stub element or of the axle tube element, respectively, is bulged, crimped or widened to such an extent that the cross section of the first mounting section has a larger diameter or a larger cross sectional extension in these sections than the recess of the linkage element. This results in an indentation which forms a tight fit that prevents, in particular, displacements of the axle stub element or the axle tube element along the axial direction in relation to the linkage element. Especially when using an IHU, very easily a widening of the axle stub element or of the axle tube element in the sections directly before or after the contact with the linkage element can be accepted in such a way that a slight bulging of the axle tube element takes place at the first mounting section and, this way, the axle tube element is positively fixed to the linkage element.

Advantageously, the adhesive layer is distributed in the contact area of the corresponding components in such a way that any penetration of moisture and pollutants into the contact area is prevented. The adhesive layer preferably applied on fixing the axle stub element, the axle tube element and the supporting element to the linkage element preferably has to prevent the ingress of moisture or dyestuffs into the contact area of the respective elements or parts, respectively. For this purpose it is especially preferred that the annular space formed between the respective first mounting sections and the respective corresponding recesses is sealed preferably by an adhesive layer at its front surfaces.

According to the invention, a chassis system for commercial vehicles is provided, comprising an axle stub element and a linkage element, where the linkage element has a recess and the axle stub element has a first mounting section, where, in a first state, the first mounting section of the axle stub element is provided with an adhesive layer and is insertable into the recess of the linkage element, where, in a second state, the first mounting section is formed in such a way that there is a force-fit of the first mounting section and the recess, where, in the second state, the first mounting section and the recess are material bond by an adhesive layer. Preferably, the first state is of the state before connecting the axle stub element to the linkage element. In the first state, the axle stub element has a first mounting section, shaped in such a way that it can be inserted into the recess of the linkage element.

According to the invention, a procedure for producing a chassis system for commercial vehicles is intended, comprising the provision of an axle stub element and a linkage element, where the axle stub element has a first mounting section and where the linkage element has a recess into which the first mounting section can be inserted; the application of an adhesive layer to the first mounting section of the axle stub element; the insertion of the first mounting section into the recess of the linkage element, in order to force-fit the first mounting section and the recess and a material bond of the first mounting section, the adhesive layer and the recess of the linkage element. According to the invention, the procedure for producing a chassis system is characterized by the fact that a force-fit or a material bond, respectively, is reached between the axle stub element and the linkage element, where, especially preferably, the disadvantages of a purely material bond connection as, for example, by a welding process, is avoided. Such disadvantages may include structural breakdowns of the respective materials used for the linkage element and for the axle stub element, due to the high temperatures required, and that, with cooling down after the welding process, substantial thermal stresses within the joined parts may impair the strength and, thus, the operational safety of the chassis system.

Preferably, the first mounting section of the axle stub element is designed in such a way that it can be inserted into the recess of the linkage element without problems; especially preferably, the outer geometry of the first mounting section corresponds with the inner geometry of the recess of the linkage element at least partially. After the first mounting section, to which, according to the invention, an adhesive layer had been applied is inserted into the recess of the linkage element, it is preferred that the axle stub element is aligned to the linkage element in a desired position. This is especially preferred when other, not rotationally symmetric parts have been provided to the axle stub element, such as a supporting element, for example, to which brakes or other secondary systems of the chassis system can be fixed. After the preferred exact alignment of the axle stub element in relation to the linkage element, the first mounting section of the axle stub element is transformed, especially preferably widened, in order to force-fit the outer contour of the mounting section and the inner contour of the recess of the linkage element. Here, preferably, on transforming, the outer surface of the mounting section is displaced and pressed into the inner surface of the recess of the linkage element, where the adhesive layer between the two surfaces is distributed consistently between the two surfaces that move one on the other, in order to reach a maximum adhesion with a gap as small as possible. In practical application it will be preferred, to force-fit the sections where the corresponding surfaces of the axle stub element and the linkage element come into contact, where, in the cavities due to unevennesses of the surfaces, the adhesive layer ensures a material bond of the first mounting sections of the respective corresponding elements and the corresponding recesses of the linkage element.

In a preferred way, an axle tube element is provided, which is arranged in a recess of the linkage element with a first mounting section and which is transformed in such a way that it force-fits the first mounting section of the axle tube element to the linkage element, where a material bond is reached by means of an adhesive layer between the first mounting section and the linkage element.

Preferable, the linkage element is a cast part and has a geometry especially suitable to ensure an advantageous flow of forces from the seating section of the axle stub element to the seating section for the suspension element or to the recess into which the axle tube element is inserted. It may be especially preferred that the linkage element consists of an aluminum alloy. The adhesive bond of the axle stub element and the aluminum-made linkage element is especially advantageous, as it is generally preferred to use a steel for the axle stub element, where the adhesive layer can prevent any contact corrosion and similar wearing processes which can arise with the metal-metal connection of aluminum and steel. By applying the adhesive layer the two metal surfaces are preferably separates, in order to prevent the so-called galvanic corrosion. This corrosion or this corrosion process, respectively, occurs in particular, when different metals come into contact and, due to different electrical potentials, the less noble metal corrodes.

According to the invention, other advantages and features of the invention arise from the following description of preferred designs of the chassis system with reference to the attached figures. Some features of the different designs may be combined within the scope of the invention. The drawings show:

DETAILED DESCRIPTION OF THE PREFERRED EMBODIMENTS

Figure 1:
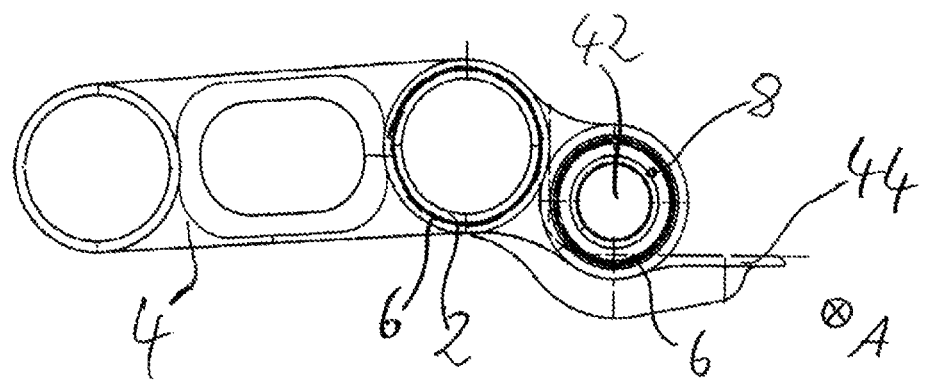
FIG. 1 is a side view of a preferred design of the chassis system according to the invention.

FIG. 1 shows a preferred design of the chassis system according to the invention, comprising the components linkage element 4, axle stub element 8 and axle tube element 2. The linkage element 4 has a number of recesses, preferably circular bores, which are preferably drilled into the linkage element in parallel to an axial direction A. Here, the axial direction A refers to the viewer's direction of view at the figure. In addition, the linkage element 4 has an elongated shape where, at a first distal end (at the left side of the figure), a recess is provided, at which the linkage element 4 can be fixed to the chassis of the commercial vehicle in a pivoted way and where at a second distal end opposing the first distal end a seating section 44 is provided on which, for example, an air spring can be placed, which preserves the second distal end (at the right side of the figure) from vertical displacement in relation to the chassis of the commercial vehicle. It is preferred that the recess or the seating section, respectively, is designed circularly at the first distal end of the linkage element; in particular, in order to take a bearing bushing and to ensure pivoting of the linkage element 4 about an axle, which extends in parallel to the axial direction A. Next to the seating section 44 the linkage element has preferably a recess 42 at which, according to the invention, an axle stub element 8 can be fixed. The axle stub element 8 is especially preferably made of a material other than the linkage element 4. Advantageously, an adhesive layer 6 is applied between the axle stub element 8 and the linkage element 4, which preferably prevents a corrosion between the metals on the one hand, and reinforces the fixation of the axle stub element 8 to the linkage element 4 by means of a material bond of the respective contact surfaces of the two elements. The axle stub element 8 preferably has circular or cylindrical surfaces, to which especially preferably a roller bearing of a wheel bearing can be meshed. In particular, this ensures that a wheel of a commercial vehicle that is pivoted or can rotate, respectively, can be fixed to the axle stub element 8. Preferably, the linkage element 4 has a second recess (shown at the right side in the figure, next to recess 42), into which an axle tube element 2 can be meshed, where, again, an adhesive layer 6 is provided between the contact surfaces of the linkage element 4 and the axle tube element 2, in order to ensure a material bond. It is preferred in particular that, after the insertion into the respective recess of the linkage element 4, both the axle tube element 2 and the axle stub element 8 are transformed in such a way that a force-fit is reached between the respective element, axle tube element 2 or axle stub element 8, and the linkage element 4. Especially preferably, the respective areas of the axle tube element 2 or the axle stub element 8 are widened and, this way, pressed against the inner surface of the recess of the linkage element 4. Particularly in comparison to friction welding, where especially preferably rotating parts are pressed against parts that are to be fixed to them and where at a certain temperature the materials of both parts merge, with the procedure according to the invention the respective parts can be positioned one to the other more precisely, because no rotation is required that produces the appropriate heat or the appropriate force for the connection. In order to safe weight it is especially preferred that the linkage element 4 has further recesses or thinning of material, in order that the linkage element has a total geometry which enables an advantageous flow of forces and, at the same time, preferably fully utilizes the material parameters, such as yield strength or break resistance of the material of the linkage element 4, by which an oversizing and, thus, too much weight of the linkage element 4 is avoided.

Figure 2:
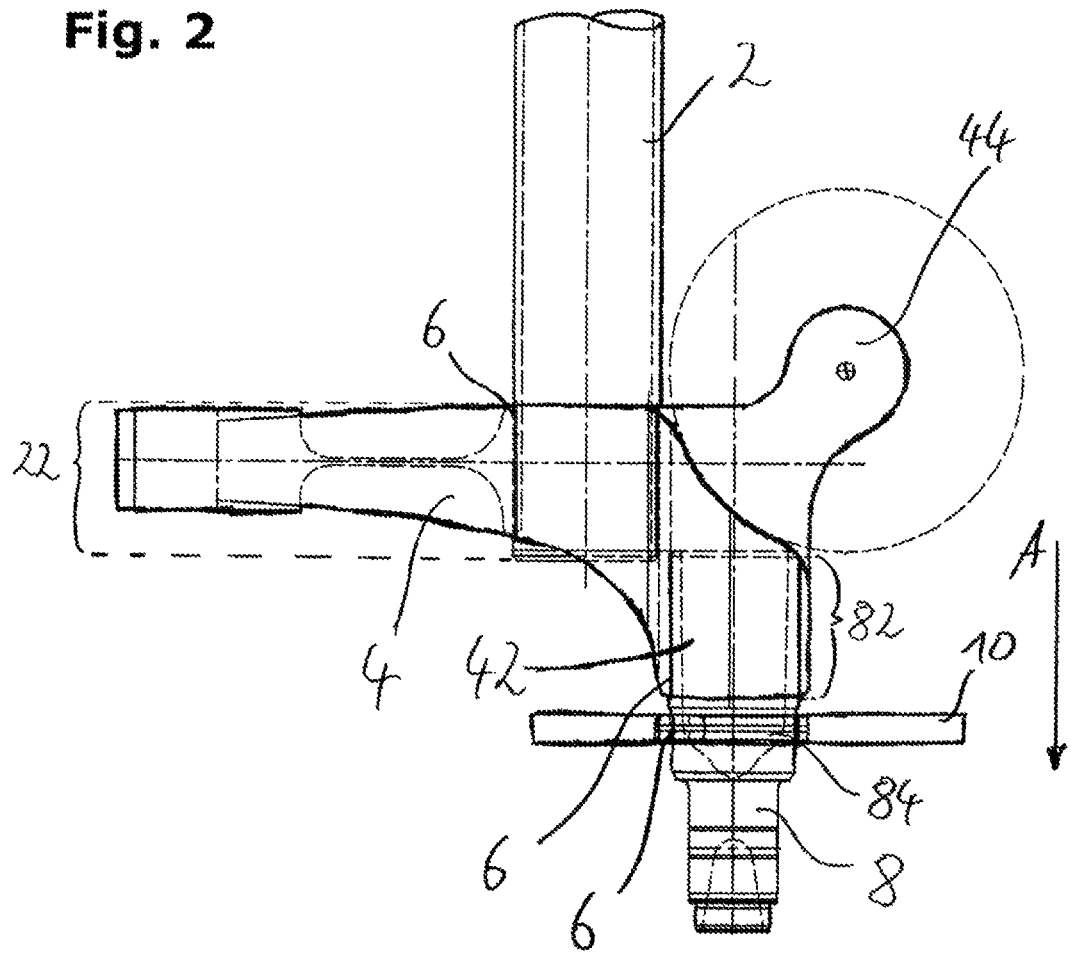
FIG. 2 is a top view of the preferred design of the chassis system according to the invention shown in FIG. 1.

FIG. 2 shows a top view of the preferred design of the chassis system according to the invention which mainly corresponds to the preferred design of the chassis system according to the invention shown in FIG. 1. A difference is that a supporting element 10 is fixed to the axle stub element 8, in order to fix further systems or components, respectively, to the chassis system. It is preferred that the axle tube element 2 and the axle stub element 8 have a main direction of extension in parallel to axial direction A, where they, especially preferably, are designed rotationally symmetric about their respective main direction of extension. It is particularly preferred that the axle stub element 8 and the axle tube element 2 are arranged offset one to the other, transversely to axial direction A, at the linkage element, in order to ensure that in the manufacturing process first the axle tube element 2 can be inserted into the recess of the linkage element 4, the mounting section 22 is widened and then the axle stub element 8 (at the bottom of the figure) in inserted into recess 42 of the linkage element 4 and the mounting section 82 of the axle stub element 8 is widened and, this way force-fitted to the linkage element 4. This manufacturing sequence would not be possible with the axle tube element 2 and the axle stub element 8 in coaxial order, where the respective open end of the two preferably tube-shaped elements, axle tube element 2 and axle stub element 8, were covered by the respective opposing element. It is preferred in particular that the supporting element 10 can be fixed to the second mounting section 84 of the axle stub element 8 even before the axle stub element 8 is fixed to the linkage element 4. Preferably, an adhesive layer 6 is provided at the mounting sections 82 and 84 of the axle stub element 8 and at the mounting section 22 of the axle tube element 2, which supports the force-fit of the respective elements 2 and/or 8 to the linkage element 4 or the supporting element 10 by a material bond. By applying the adhesive layer 6 it is also possible to use different materials for the production of the axle tube element 2, the axle stub element 8, the linkage element 4 and the supporting element 10, without taking an increased risk of an intermetallic or galvanic corrosion. In FIG. 2, the compact design of the linkage element 4 is shown, where the seating section 44 for an air spring (indicated by broken lines) is designed in such a way that the air spring (at a top view) intersects the main extension axis of the axle stub element 8.

The geometry of linkage element 4, which is optimized for an advantageous flow of forces or tensions, ensures that high bending moments can be taken while having a compact design. The arrangement of the seating section 44 for an air spring or a similar suspension element can be as close as possible to the axle tube element 2 and to the axle stub element 8 at the same time, which enables the reduction of not only the length in longitudinal direction of the vehicle, but also of the weight of the linkage element 4. In addition, a preferably low design of the chassis of the commercial vehicle can be reached by arranging the working point of the air spring at the seating section 44 vertically below the main extension axis of the axle stub element 8. According to known designs from prior art of a chassis system, the air spring or the seating section 44 for an air spring is often arranged above the axle tube element 2 or the axle stub element 8, respectively, which increases the height of the chassis significantly and, thus, in relation to the entire commercial vehicle, due to the maximum height limitation of commercial vehicles, results in a reduces loading space. Furthermore, by the overall compact design of the linkage element 4, in comparison to traditional linkage elements, weight can be saved, fuel costs minimized, and the maximum load capacity of the commercial vehicle can be increased.

Figure 3:
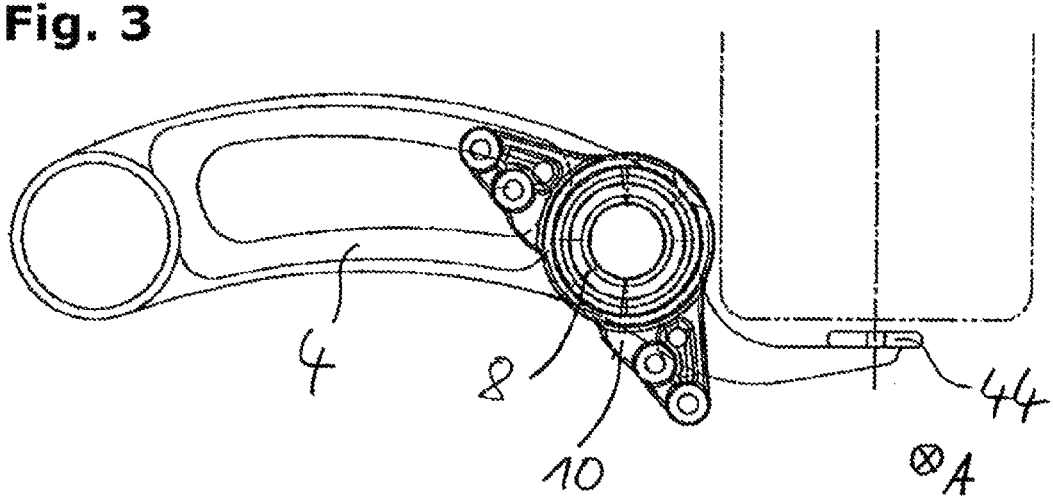
FIG. 3 is a side view of another preferred design of the chassis system according to the invention.

FIG. 3 shows another preferred design of the chassis system according to the invention, with the supporting element 10 shown clearly. It is preferred in particular that the supporting element 10 is a brake carrier, to which the components of the brake system that are stationary in relation to the commercial vehicle are fixed, such as, for example, the brake disk or the brake shoes of a drum brake. In addition, it is shown in the figure that the seating section 44 of the linkage element 4 is arranged significantly below the main extension axis of the axle stub element 8 and, this way, the height of the design of the chassis system can be reduced significantly. The double-dot interrupted line indicates a suspension element at the seating section 44, where it is specifically advantageous with a given vertical extension of this suspension element, to fix the suspension element as low as possible (thus, in the figure as close to the bottom as possible) to the linkage element 4.

Figure 4:
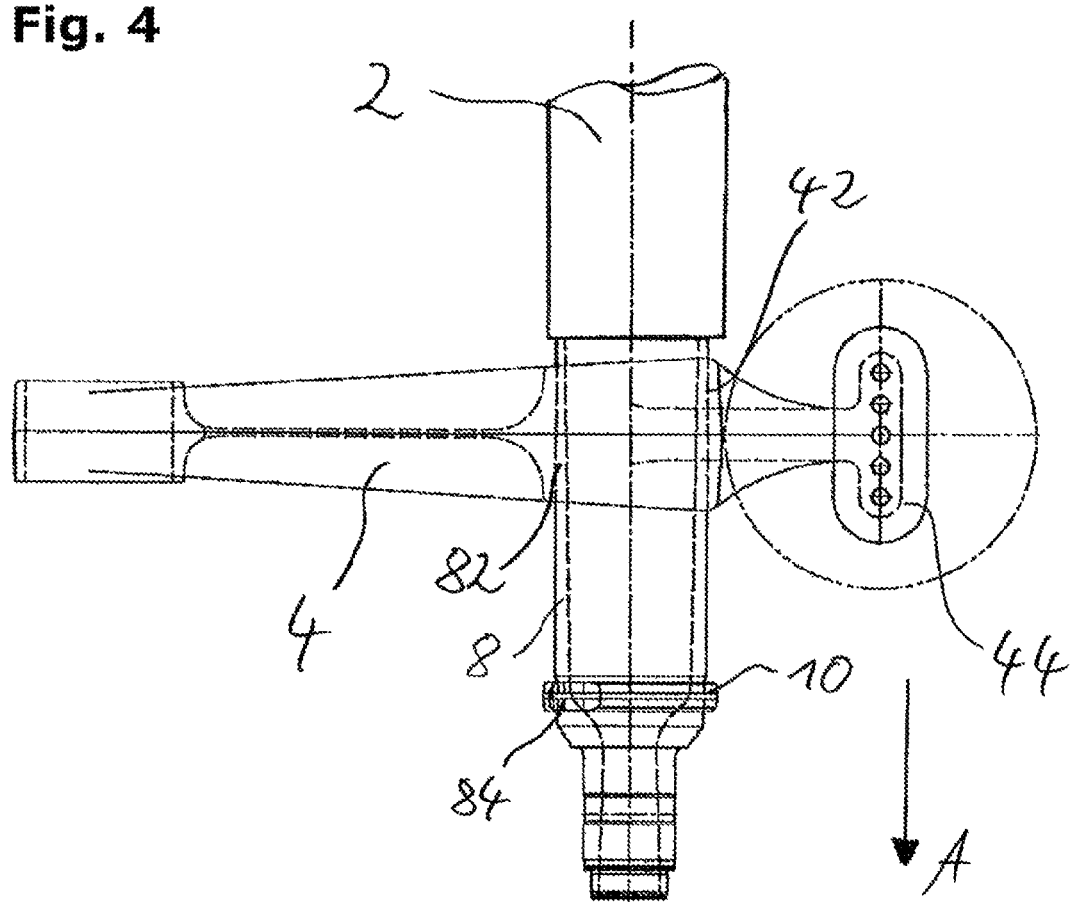
FIG. 4 is a top view of the preferred design of the chassis system according to the invention shown in FIG. 3.

FIG. 4 shows a top view of a preferred design of the chassis system according to the invention. Here, preferably, the axle stub element 8 has a first mounting section 82 and a second mounting section 84 to be force-fitted and material bond to both the linkage element 4 and the supporting element 10. Alternatively to the preferred designs described so far, the axle tube element 2 is aligned coaxially to the axle stub element 8 and, especially preferably, fixed to the end of the axle stub element 8 (shown at the top of the figure) by friction welding. Alternatively, it could also be preferred to insert the axle tube element 2 at least partially into the end of the axle stub element 8 (shown at the top of the figure) after fixing the axle stub element 8 to the linkage element 4 and, again, apply an adhesive layer 6 and to widen the axle tube element 2 by means of a high pressure transforming process at least at the overlapping part with the axle stub element 8, and to force-fit it to the axle stub element 8, this way.

Figure 5:
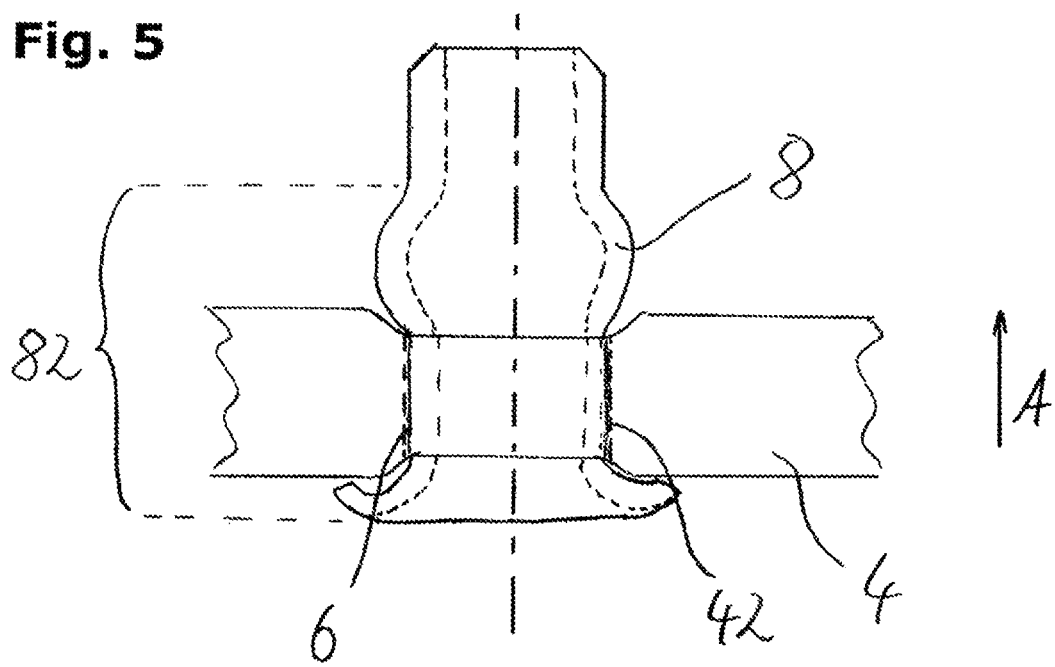
FIG. 5 is a view of a preferred design of the chassis system according to the invention.

FIG. 5 shows a detailed view of a preferred mounting design of the axle stub element 8 to the linkage element 4. Here, besides the force-fit which is supported by a material bond by means of the adhesive layer 6, also a tight fit of the axle stub element 8 and the linkage element 4 is provided. Especially preferably, this tight fit is reached by the fact that the axle stub element 8 has a first mounting section 82 that has a longer extension along the axial direction a than the linkage element 4 in the section of the recess 42. At the first mounting section 82, the axle stub element 8 widened to such an way that, on the one hand, a force-fit is reached in the area where it is inserted into the recess and, on the other hand, the axle stub element 8 undercuts the recess 42, preferably before and/or behind the linkage element 4. This way, advantageously, a displacement of the axle stub element 8 in relation to the linkage element 4 along the axial direction A is prevented. Preferably, the axle stub element 8 may have a crimping at one end, which can be formed, for example, by a spike.

Figure 6:
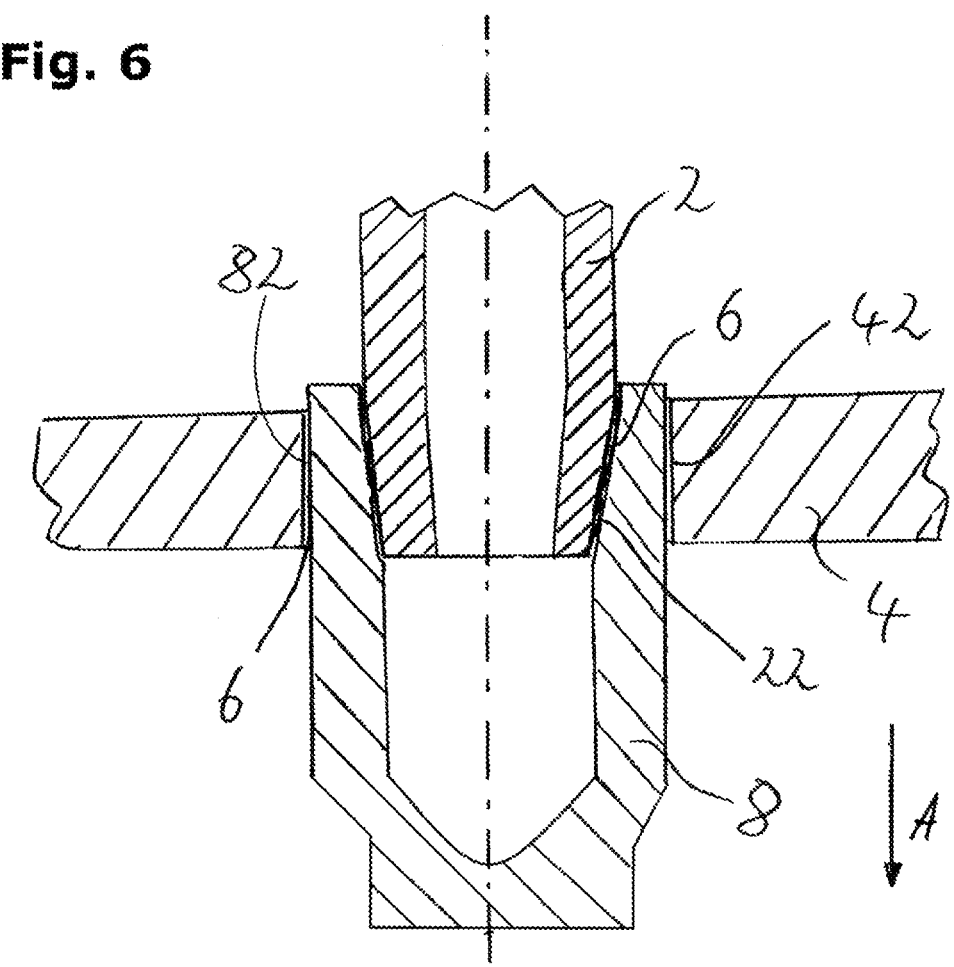
FIG. 6 is a sectional plane of a preferred design of the chassis system according to the invention.

FIG. 6 shows a sectional plane of another preferred design of the chassis system. Preferably, the axle stub element 8 and the axle tube element 2 are aligned in a coaxial way, where the mounting section 22 of the axle tube element 2 can be inserted into the preferably open end of the axle stub element 8, where a force-fitted connection to the axle stub element 8 can be realized by a tapered or conic layout of the first mounting section 22. Here, it is preferred that, on insertion of the first mounting section 22 of the axle tube element 2, the first mounting section 82 of the axle stub element 8 is widened and, for his part, force-fits to the recess 42 of the linkage element 4. In an especially preferred way, the force-fitted connections of the axle stub element 8 and the linkage element 4 and the axle tube element 2 and the axle stub element 8 are supported firmly bonded by adhesive layers 6 on their respective contact surfaces.

LIST OF REFERENCE NUMBERS

2—axle tube element
4—linkage element
6—adhesive layer
8—axle stub element
10—supporting element
22—first mounting section of the axle tube element
42—recess of the linkage element
44—seating section
82—first mounting section of the axle stub element
84—second mounting section of the axle stub element
A—axial direction

The invention claimed is:

1. A chassis system for commercial vehicles, comprising:
an axle stub element, wherein the axle stub element comprises a hollow body; and
a linkage element;
wherein the linkage element includes a recess and the axle stub element includes a first mounting section;
wherein the first mounting section is arranged in the recess of the linkage element and is force-fitted to the recess by a high-pressure deformation process;
wherein an adhesive layer is provided between the first mounting section and the recess, and a material bond is formed between the first mounting section of the axle stub element and the recess of the linkage element; and
wherein an axle tube element is fixed at the linkage element to increase a stability of the chassis system.

2. The chassis system according to claim 1, wherein the axle stub element includes at least one of one-level and one-piece.

3. The chassis system according to claim 2, wherein the axle tube element includes at least one of being force-fitted and material bonded at the linkage element.

4. The chassis system according to claim 3, wherein the axle stub element is arranged transversely offset to a main extension axis of the axle tube element with respect to the axle tube element, wherein the axle tube element is connected with the linkage element, and wherein the at least one of the axle stub element and the axle tube element is force-fit connected with the linkage element by a forming process.

5. The chassis system according to claim 4, further comprising:
a supporting element fixed to at least one of the axle tube element, the axle stub element, and to the linkage element fixing additional chassis elements to the chassis system.

6. The chassis system according to claim 5, wherein the supporting element includes a recess in which at least one of a second mounting section of the axle tube element and a second mounting section of the axle stub element is force-fit, and wherein a second adhesive layer is provided between the recess of the supporting element and the respective second mounting section to form a material bond between the supporting element and one of the axle tube element and the axle stub element.

7. The chassis system according to claim 6, wherein the linkage element is configured to be swivel-mounted at a first distal end to a frame of a commercial vehicle, and wherein the linkage element includes a seating section at a second distal end opposite the first distal end, to seat a suspension element and to transfer forces from the suspension element to at least one of the axle tube element and the axle stub element.

8. The chassis system according to claim 7, wherein the adhesive layers each consist of at least one of a polyurethane, an epoxy resin, and a silicone.

9. The chassis system according to claim 8, wherein at least one of the axle stub element and the axle tube element include at least one of an undercut and an indentation, by which a force-fitted connection is achieved between the first mounting section and the recess of the linkage element.

10. The chassis system according to claim 9, wherein the adhesive layers are each distributed in a contact area between the linkage element and the at least one of the axle stub element and the axle tube element such that the adhesive layers prevent penetration of moisture and pollutants into the contact area.

11. The chassis system according to claim 10, wherein the linkage element includes a cast part, and wherein geometry of the linkage element is configured to enable an advantageous power flow from the axle stub element to at least one of a supporting section for a suspension element and the recess of the linkage element.

12. The chassis system according to claim 1, wherein the axle tube element includes at least one of being force-fitted and material bonded at the linkage element.

13. The chassis system according to claim 1, wherein the axle stub element is arranged transversely offset to a main extension axis of the axle tube element with respect to the axle tube element, wherein the axle tube element is connected with the linkage element, and wherein the at least one of the axle stub element and the axle tube element is force-fit connected with the linkage element by a forming process.

14. The chassis system according to claim 1, further comprising:
a supporting element fixed to at least one of the axle tube element, the axle stub element, and to the linkage element fixing additional chassis elements to the chassis system.

15. The chassis system according to claim 14, wherein the supporting element includes a recess in which at least one of a second mounting section of the axle tube element and a second mounting section of the axle stub element is force-fit, and wherein a second adhesive layer is provided between the recess of the supporting element and the respective second mounting section to form a material bond between the supporting element and one of the axle tube element and the axle stub element.

16. The chassis system according to claim 1, wherein the linkage element is configured to be swivel-mounted at a first distal end to a frame of a commercial vehicle, and wherein the linkage element includes a seating section at a second distal end opposite the first distal end, to seat a suspension element and to transfer forces from the suspension element to at least one of the axle tube element and the axle stub element.

17. The chassis system according to claim 1, wherein the adhesive layer consists of at least one of a polyurethane, an epoxy resin, and a silicone.

18. The chassis system according to claim 1, wherein at least one of the axle stub element and the axle tube element include at least one of an undercut and an indentation, by which a force-fitted connection is achieved between the first mounting section and the recess of the linkage element.

19. The chassis system according to claim 1, wherein the adhesive layer is distributed in a contact area between the linkage element and the at least one of the axle stub element and the axle tube element such that the adhesive layer prevents penetration of moisture and pollutants into the contact area.

20. The chassis system according to claim 1, wherein the linkage element is a cast part, and wherein geometry of the linkage element is configured to enable an advantageous power flow from the axle stub element to at least one of a supporting section for a suspension element and the recess.

21. A chassis system for commercial vehicles, comprising:
an axle stub element, wherein the axle stub element comprises a hollow body; and
a linkage element;
wherein the linkage element includes a recess and the axle stub element includes a first mounting section;
wherein the first mounting section of the axle stub element includes an adhesive layer and is insertable into the recess of the linkage element at a first state;
wherein the first mounting section is formed by a high-pressure deformation process such that the first mounting section and the recess are force-fit connected at a second state;
wherein, in the second state, the first mounting section and the recess are material bonded by the adhesive layer; and
wherein an axle tube element is provided that is fixed to the linkage element to increase a stability of the chassis system.

22. A method of manufacturing a chassis system for commercial vehicles, comprising:
providing an axle stub element and a linkage element, wherein the axle stub element includes a first mounting section, and wherein the linkage element includes a recess in which the first mounting section is insertable;
applying an adhesive layer onto the first mounting section of the axle stub element;
inserting the first mounting section into the recess of the linkage element;
transforming the first mounting section to provide a force-locked connection between the first mounting section and the recess and to provide a material bond of the first mounting section, the adhesive layer and the recess of the linkage element; and
fixing an axle tube element over the first mounting section in the recess of the linkage element.

23. The method according to claim 22, wherein the axle tube element is arranged over the first mounting section thereof in the recess of the linkage element and is transformed such that a force-locked connection is achieved between the first mounting section of the axle tube element and the linkage element, and wherein the adhesive layer forms a material bond between the first mounting section and the linkage element.

24. The method of claim 22, wherein transforming the first mounting section includes expanding the first mounting section.

* * * * *